(12) United States Patent
Davison et al.

(10) Patent No.: US 7,550,939 B2
(45) Date of Patent: Jun. 23, 2009

(54) REDUNDANT INSTANTANEOUS TRIP DETECTION

(76) Inventors: William Davison, 2451 5th Ave. SE., Cedar Rapids, IA (US) 52403; David Joseph Dunne, 3807 Terrace Hill Dr. NE., Cedar Rapids, IA (US) 52402; Kevin John Malo, 835 Oakcrest, Iowa City, IA (US) 52246; Steve M. Meehleder, 505 Huntington Ridge Rd., Cedar Rapids, IA (US) 52402; Richard Allen Studer, II, 2408 Hwy. 18, Wesley, IA (US) 50483

( * ) Notice: Subject to any disclaimer, the term of this patent is extended or adjusted under 35 U.S.C. 154(b) by 177 days.

(21) Appl. No.: 11/824,681

(22) Filed: Jul. 2, 2007

(65) Prior Publication Data

US 2008/0013235 A1    Jan. 17, 2008

Related U.S. Application Data

(60) Provisional application No. 60/831,006, filed on Jul. 14, 2006.

(51) Int. Cl.
*H02P 1/04* (2006.01)
(52) U.S. Cl. .................. 318/430; 318/432; 318/433
(58) Field of Classification Search ............ 361/42, 361/62, 23, 61, 69; 318/430, 432, 433, 434
See application file for complete search history.

(56) References Cited

U.S. PATENT DOCUMENTS

| | | | |
|---|---|---|---|
| 4,301,435 A | 11/1981 | Castonguay et al. | 335/26 |
| 4,679,019 A | 7/1987 | Todaro et al. | 335/172 |
| 4,951,052 A | 8/1990 | Jacob et al. | 341/122 |
| 4,992,723 A | 2/1991 | Zylstra et al. | 323/284 |
| 5,014,025 A | 5/1991 | Papallo, Jr. et al. | 335/167 |
| 5,124,875 A | 6/1992 | Ishii et al. | 361/93 |
| 5,276,416 A | 1/1994 | Ozaki | 335/18 |

(Continued)

FOREIGN PATENT DOCUMENTS

EP    0 303 994 A    2/1989

(Continued)

OTHER PUBLICATIONS

Written Opinion corresponding to co-pending International Patent Application Serial No. PCT/US2007/015914, European Patent Office, dated Mar. 14, 2008, 8 pages.

(Continued)

*Primary Examiner*—Karen Masih (57) ABSTRACT

A motor circuit protector that trips in accordance with an instantaneous trip curve that is split into three protection regions, a self-protection region, an in-rush avoidance region, and a locked-rotor avoidance region. Software modules for detecting whether primary current exceeds each region are run in parallel or simultaneously, providing redundant instantaneous trip detection, and these redundant protection regions remain active throughout the startup and steady-state modes of operation of the motor circuit protector. This redundancy provides improved time current trip performance for a wide variety of short circuit conditions and improved system safety properties are realized. The current threshold for the self-protection region can be adjusted toward the in-rush avoidance region once steady-state operation is achieved. In startup mode, only the self-protection region may be detected, but can remain active during steady-state mode.

22 Claims, 9 Drawing Sheets

U.S. PATENT DOCUMENTS

| | | | |
|---|---|---|---|
| 5,343,179 A | 8/1994 | Pipich et al. | 335/167 |
| 5,510,773 A | 4/1996 | Rodgers | 340/638 |
| 5,646,586 A | 7/1997 | Castonguay et al. | 335/132 |
| 5,666,256 A | 9/1997 | Zavis et al. | 361/115 |
| 5,670,923 A | 9/1997 | Gonzalez et al. | 335/177 |
| 5,701,111 A | 12/1997 | Castonguay et al. | 335/177 |
| 5,710,399 A | 1/1998 | Castonguay et al. | 200/17 R |
| 6,009,615 A | 1/2000 | McKean et al. | 29/602.1 |
| 6,031,195 A | 2/2000 | Meili et al. | 200/318 |
| 6,061,217 A | 5/2000 | Grunert et al. | 361/42 |
| 6,084,756 A | 7/2000 | Doring et al. | 361/45 |
| 6,154,115 A | 11/2000 | Flohr | 337/13 |
| 6,351,232 B1 | 2/2002 | Marie | 341/155 |
| 6,922,318 B2 * | 7/2005 | Matsumoto et al. | 361/42 |
| 7,307,504 B1 | 12/2007 | Carlino et al. | 336/213 |
| 2002/0145416 A1 | 10/2002 | Attarian et al. | 324/127 |

FOREIGN PATENT DOCUMENTS

| | | |
|---|---|---|
| EP | 0 477 936 A | 4/1992 |
| EP | 0 580 473 A | 1/1994 |
| GB | 397 635 A | 8/1933 |
| GB | 1 293 134 A | 10/1972 |
| GB | 2 360 135 A | 9/2001 |
| WO | WO 2006/087342 A1 | 8/2006 |

OTHER PUBLICATIONS

International Search Report corresponding to co-pending International Patent Application Serial No. PCT/US2007/015914, European Patent Office, dated Mar. 14, 2008, 8 pages.

* cited by examiner

REDUNDANT INSTANTANEOUS TRIP DETECTION

RELATED APPLICATION

This application claims the benefit of U.S. Provisional Application No. 60/831,006, filed Jul. 14, 2006, titled "Motor Circuit Protector," which is hereby incorporated by reference in its entirety.

FIELD OF THE INVENTION

The present invention relates generally to circuit breaker devices, and, in particular, to redundant instantaneous trip detection.

BACKGROUND OF THE INVENTION

As is well known, a circuit breaker is an automatically operated electro-mechanical device designed to protect a conductor from damage caused by an overload or a short circuit. Circuit breakers may also be utilized to protect loads. A circuit breaker may be tripped by an overload or short circuit, which causes an interruption of power to the load. A circuit breaker can be reset (either manually or automatically) to resume current flow to the load. One application of circuit breakers is to protect motors as part of a motor control center ("MCC"). A typical MCC includes a temperature triggered overload relay, a contactor and a motor circuit protector ("MCP"). The MCP is a specialized circuit breaker that provides instantaneous protection against instantaneous short-circuit events. These motor circuit protector devices must meet National Electric Code ("NEC") requirements when installed as part of a UL-listed MCC to provide instantaneous short-circuit protection.

Mechanical circuit breakers energize an electro-magnetic device such as a solenoid to trip instantaneously in response to a rapid surge in current such as a short circuit. Existing MCPs protect only a limited range of motors, but should avoid tripping in response to in-rush motor currents that occur during motor start-up while tripping on a range of fault currents including instantaneous short-circuit currents.

What is needed, therefore, is a circuit breaker system with improved trip protection.

SUMMARY OF THE INVENTION

Briefly, according to an aspect of the present invention, a motor circuit protector trips in accordance with an instantaneous trip curve that is split into three protection regions (in no particular order), a self-protection region, an in-rush avoidance region, and a locked-rotor avoidance region. Software modules for detecting whether primary current exceeds each region is run in parallel or simultaneously, providing redundant instantaneous trip detection, and these redundant protection regions remain active throughout the startup and steady-state modes of operation of the motor circuit protector. This redundancy provides improved time current trip performance for a wide variety of short circuit conditions and improved system safety properties are realized. The current threshold for the self-protection region can be adjusted toward the in-rush avoidance region once steady-state operation is achieved. In startup mode, only the self-protection region may be detected but can remain active during steady-state mode. The redundant trip detection of the present invention improves short-circuit fault detection for both "Close on Fault" and "Fault in Steady State" scenarios. Higher protection levels remain active throughout startup and steady-state modes of operation.

Aspects of the present invention advantageously improve self-protection detection of the motor circuit protector and provide a fast response to high instantaneous faults. Additional advantages include improved instantaneous short-circuit protection with simultaneous implementation of locked-rotor and in-rush avoidance protection. As a result, the motor circuit protector is less prone to nuisance tripping while having high availability for enhanced functions. The redundant trip detection aspects of the present invention also improve system safety properties. Finally, software aspects of the various embodiments described herein will be compliant with UL-1998 and IEC-61508.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Figure 1:
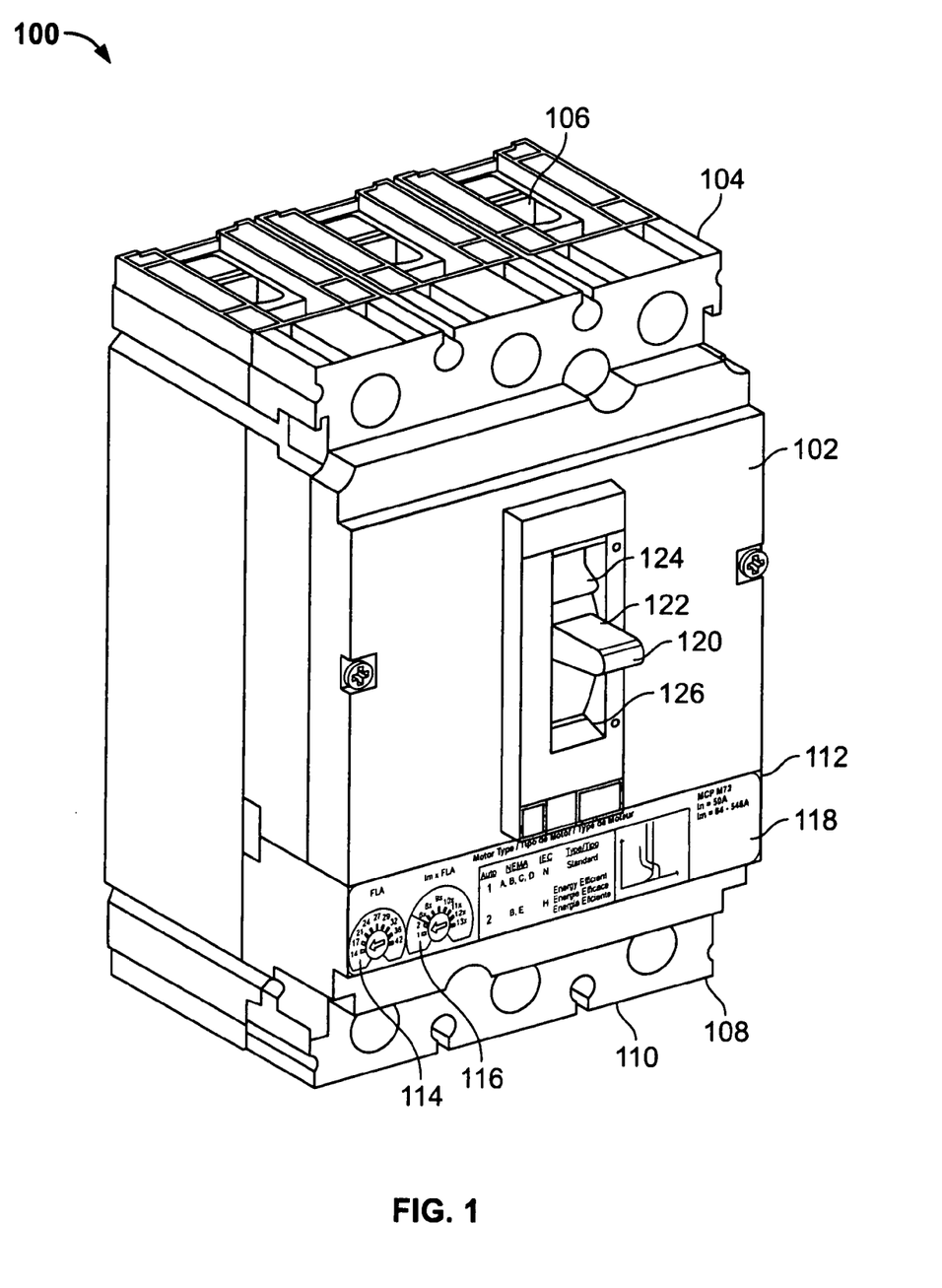
FIG. 1 is perspective view of a motor circuit protector according to the present application.

Turning now to FIG. 1, an electronic motor circuit protector 100 is shown. The motor circuit protector 100 includes a durable housing 102 including a line end 104 having line terminals 106 and a load end 108 having load lugs or terminals 110. The line terminals 106 allow the motor circuit protector 100 to be coupled to a power source and the load terminals 110 allow the motor circuit protector 100 to be coupled to an electrical load such as a motor as part of a motor control center ("MCC"). In this example the motor circuit protector 100 includes a three-phase circuit breaker with three poles, although the concepts described below may be used with circuit protectors with different numbers of poles, including a single pole.

The motor circuit protector 100 includes a control panel 112 with a full load ampere ("FLA") dial 114 and an instantaneous trip point ("$I_m$") dial 116 which allows the user to configure the motor circuit protector 100 for a particular type of motor to be protected within the rated current range of the motor circuit protector 100. The full load ampere dial 114 allows a user to adjust the full load which may be protected by the motor circuit protector 100. The instantaneous trip point dial 116 has settings for automatic protection (three levels in this example) and for traditional motor protection of a trip point from 8 to 13 times the selected full load amperes on the full load ampere dial 114. The dials 114 and 116 are located next to an instruction graphic 118 giving guidance to a user on the proper settings for the dials 114 and 116. In this example, the instruction graphic 118 relates to NEC recommended settings for the dials 114 and 116 for a range of standard motors. The motor circuit protector 100 includes a breaker handle 120 that is moveable between a TRIPPED position 122 (shown in FIG. 1), an ON position 124 and an OFF position 126. The position of the breaker handle 120 indicates the status of the motor circuit protector 100. For example, in order for the motor circuit protector 100 to allow power to flow to the load, the breaker handle 120 must be in the ON position 124 allowing power to flow through the motor circuit protector 100. If the circuit breaker is tripped, the breaker handle 120 is moved to the TRIPPED position 122 by a disconnect mechanism, causing an interruption of power and disconnection of downstream equipment. In order to activate the motor circuit protector 100 to provide power to downstream equipment or to reset the motor circuit protector 100 after tripping the trip mechanism, the breaker handle 120 must be moved manually from the TRIPPED position 120 to the OFF position 126 and then to the ON position 124.

Figure 2:
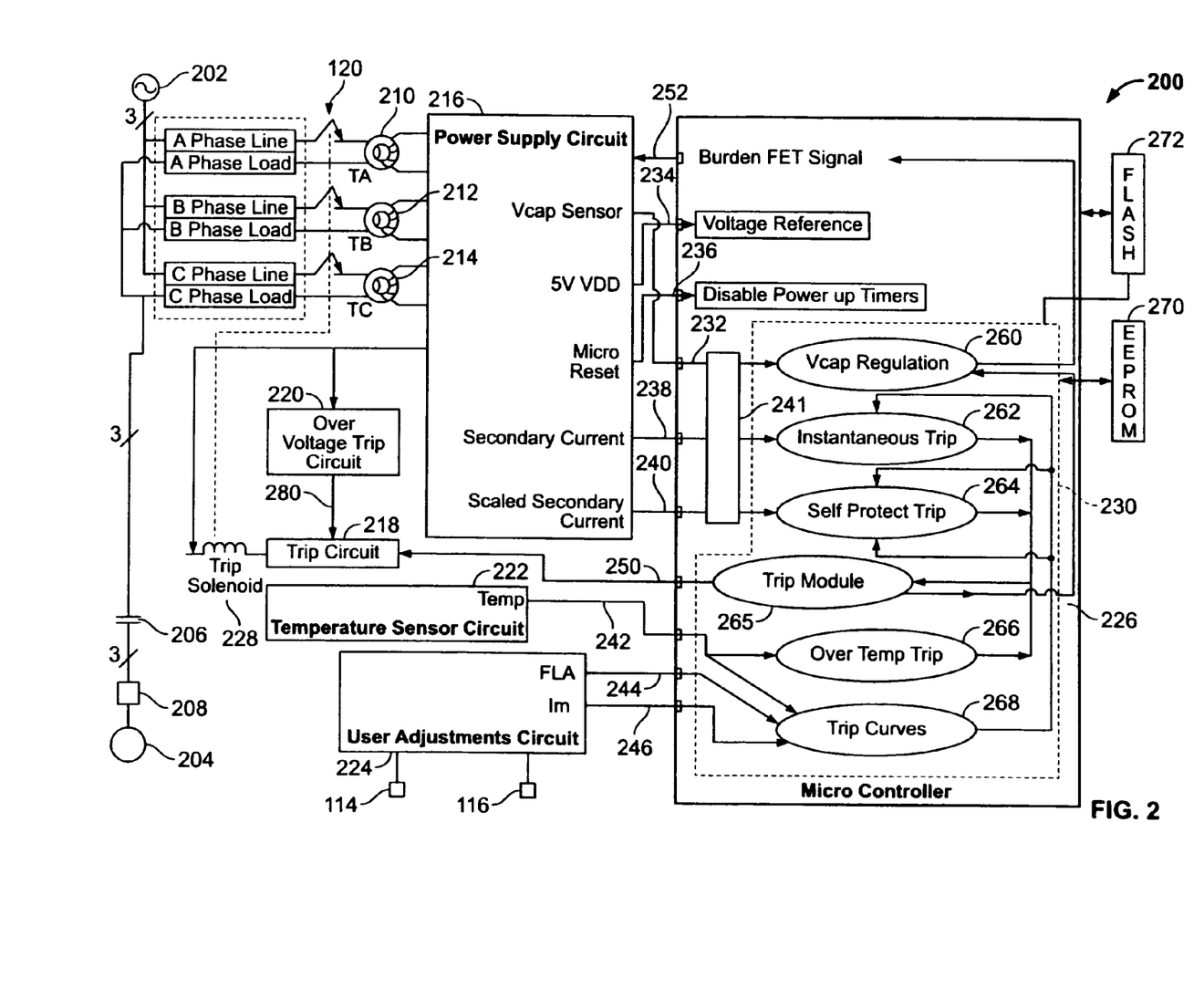
FIG. 2 is a functional block diagram of the motor circuit protector in FIG. 1.

FIG. 2 is a functional block diagram of the motor circuit protector 100 in FIG. 1 as part of a typical MCC configuration 200 coupled between a power source 202 and an electrical load such as a motor 204. The MCC configuration 200 also includes a contactor 206 and an overload relay 208 downstream from the power source 202. Other components such as a variable speed drive, start/stop switches, fuses, indicators and control equipment may reside either inside the MCC configuration 200 or outside the MCC configuration 200 between the power source 202 and the motor 204. The motor circuit protector 100 protects the motor 204 from a short circuit condition by actuating the trip mechanism, which causes the breaker handle 120 to move to the TRIPPED position when instantaneous short-circuit conditions are detected. The power source 202 in this example is connected to the three line terminals 106, which are respectively coupled to the primary windings of three current transformers 210, 212 and 214. Each of the current transformers 210, 212 and 214 has a phase line input and a phase load output on the primary winding. The current transformers 210, 212 and 214 correspond to phases A, B and C from the power source 202. The current transformers 210, 212 and 214 in this example are iron-core transformers and function to sense a wide range of currents. The motor circuit protector 100 provides instantaneous short-circuit protection for the motor 204.

The motor circuit protector 100 includes a power supply circuit 216, a trip circuit 218, an over-voltage trip circuit 220, a temperature sensor circuit 222, a user adjustments circuit 224, and a microcontroller 226. In this example, the microcontroller 226 is a PIC16F684-E/ST programmable microcontroller, available from Microchip Technology, Inc. based in Chandler, Ariz., although any suitable programmable controller, microprocessor, processor, etc. may be used. The microcontroller 226 includes current measurement circuitry 241 that includes a comparator and an analog-to-digital converter. The trip circuit 218 sends a trip signal to an electromechanical trip solenoid 228, which actuates a trip mechanism, causing the breaker handle 120 in FIG. 1 to move from the ON position 124 to the TRIPPED position 122, thereby interrupting power flow to the motor 204. In this example, the electro-mechanical trip solenoid 228 is a magnetic latching solenoid that is actuated by either stored energy from a discharging capacitor in the power supply circuit 216 or directly from secondary current from the current transformers 210, 212 and 214.

The signals from the three current transformers 210, 212 and 214 are rectified by a conventional three-phase rectifier circuit (not shown in FIG. 2), which produces a peak secondary current with a nominally sinusoidal input. The peak secondary current either fault powers the circuits 216, 218, 220, 222, and 224 and the microcontroller 226, or is monitored to sense peak fault currents. The default operational mode for current sensing is interlocked with fault powering as will be explained below. A control algorithm 230 is responsible for, inter alia, charging or measuring the data via analog signals representing the stored energy voltage and peak current presented to configurable inputs on the microcontroller 226. The control algorithm 230 is stored in a memory that can be located in the microcontroller 226 or in a separate memory device 272, such as a flash memory. The control algorithm 230 includes machine instructions that are executed by the microcontroller 226. All software executed by the microcontroller 226 including the control algorithm 230 complies with the software safety standard set forth in UL-489 SE and can also be written to comply with IEC-61508. The software requirements comply with UL-1998. As will be explained below, the configurable inputs may be configured as analog-to-digital ("A/D") converter inputs for more accurate comparisons or as an input to an internal comparator in the current measurement circuitry 241 for faster comparisons. In this example, the A/D converter in the current measurement circuitry 241 has a resolution of 8/10 bits, but more accurate A/D converters may be used and may be separate and coupled to the microcontroller 226. The output of the temperature sensor circuit 222 may be presented to the A/D converter inputs of the microcontroller 226.

The configurable inputs of the microcontroller 226 include a power supply capacitor input 232, a reference voltage input 234, a reset input 236, a secondary current input 238, and a scaled secondary current input 240, all of which are coupled to the power supply circuit 216. The microcontroller 226 also includes a temperature input 242 coupled to the temperature sensor circuit 222, and a full load ampere input 244 and an instantaneous trip point input 246 coupled to the user adjustments circuit 224. The user adjustments circuit 224 receives inputs for a full load ampere setting from the full load ampere dial 114 and either a manual or automatic setting for the instantaneous trip point from the instantaneous trip point dial 116.

The microcontroller 226 also has a trip output 250 that is coupled to the trip circuit 218. The trip output 250 outputs a trip signal to cause the trip circuit 218 to actuate the trip solenoid 228 to trip the breaker handle 120 based on the conditions determined by the control algorithm 230. The microcontroller 226 also has a burden resistor control output 252 that is coupled to the power supply circuit 216 to activate current flow across a burden resistor (not shown in FIG. 2) and maintain regulated voltage from the power supply circuit 216 during normal operation.

The breaker handle 120 controls manual disconnect operations allowing a user to manually move the breaker handle 120 to the OFF position 126 (see FIG. 1). The trip circuit 218 can cause a trip to occur based on sensed short circuit conditions from either the microcontroller 226, the over-voltage trip circuit 220 or by installed accessory trip devices, if any. As explained above, the microcontroller 226 makes adjustment of short-circuit pickup levels and trip-curve characteristics according to user settings for motors with different current ratings. The current path from the secondary output of the current transformers 210, 212, 214 to the trip solenoid 228 has a self protection mechanism against high instantaneous fault currents, which actuates the breaker handle 120 at high current levels according to the control algorithm 230.

The over-voltage trip circuit 220 is coupled to the trip circuit 218 to detect an over-voltage condition from the power supply circuit 216 to cause the trip circuit 218 to trip the breaker handle 120 independently of a signal from the trip output 250 of the microcontroller 226. The temperature sensor circuit 222 is mounted on a circuit board proximate to a copper burden resistor (not shown in FIG. 2) together with other electronic components of the motor circuit protector 100. The temperature sensor circuit 222 and the burden resistor are located proximate each other to allow temperature coupling between the copper traces of the burden resistor and the temperature sensor. The temperature sensor circuit 222 is thermally coupled to the power supply circuit 216 to monitor the temperature of the burden resistor. The internal breaker temperature is influenced by factors such as the load current and the ambient temperatures of the motor circuit protector 100. The temperature sensor 222 provides temperature data to the microcontroller 226 to cause the trip circuit 218 to actuate the trip solenoid 228 if excessive heat is detected. The output of the temperature sensor circuit 222 is coupled to the microcontroller 226, which automatically compensates for operation temperature variances by automatically adjusting trip curves upwards or downwards.

The microcontroller 226 first operates the power supply circuit 216 in a startup mode when a reset input signal is received on the reset input 236. A charge mode provides voltage to be stored for actuating the trip solenoid 228. After a sufficient charge has been stored by the power supply circuit 216, the microcontroller 226 shifts to a normal operation mode and monitors the power supply circuit 216 to insure that sufficient energy exists to power the electro-mechanical trip solenoid 228 to actuate the breaker handle 120. During each of these modes, the microcontroller 226 and other components monitor for trip conditions.

The control algorithm 230 running on the microcontroller 226 includes a number of modules or subroutines, namely, a voltage regulation module 260, an instantaneous trip module 262, a self protection trip module 264, an over temperature trip module 266 and a trip curves module 268. The modules 260, 262, 264, 266 and 268 generally control the microcontroller 226 and other electronics of the motor circuit protector 100 to perform functions such as governing the startup power, establishing and monitoring the trip conditions for the motor circuit protector 100, and self protecting the motor circuit protector 100. A storage device 270, which in this example is an electrically erasable programmable read only memory (EEPROM), is coupled to the microcontroller 226 and stores data accessed by the control algorithm 230 such as trip curve data and calibration data as well as the control algorithm 230 itself. Alternately, instead of being coupled to the microcontroller 226, the EEPROM may be internal to the microcontroller 226.

Figure 3:
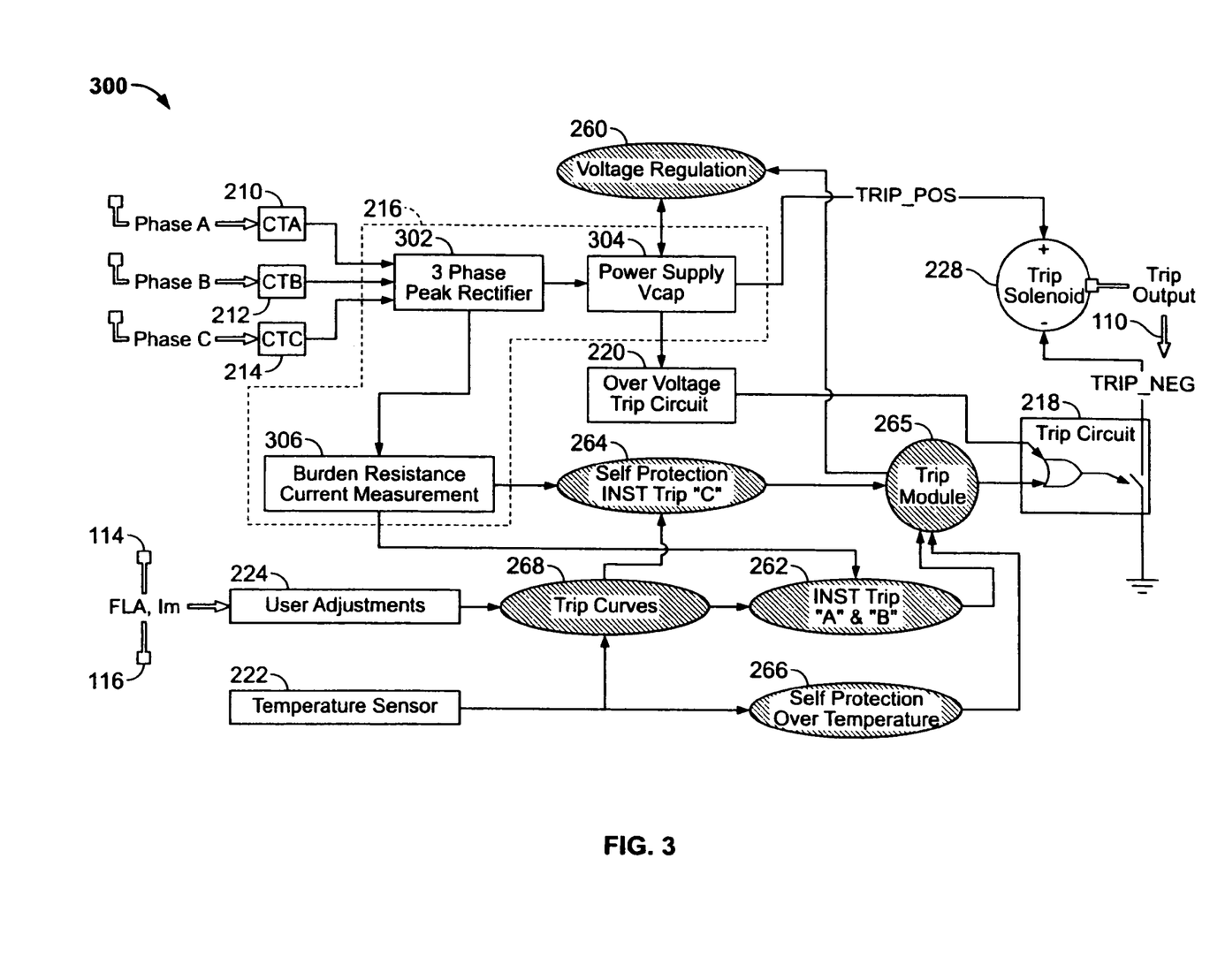
FIG. 3 is a functional block diagram of the operating components of a control algorithm of the motor circuit protector in FIG. 1.

FIG. 3 is a functional block diagram 300 of the interrelation between the hardware components shown in FIG. 2 and software/firmware modules 260, 262, 264, 266 and 268 of the control algorithm 230 run by the microcontroller 226. The secondary current signals from the current transformers 210, 212 and 214 are coupled to a three-phase rectifier 302 in the power supply circuit 216. The secondary current from the three-phase rectifier 302 charges a stored energy circuit 304 that supplies sufficient power to activate the trip solenoid 228 when the trip circuit 218 is activated. The voltage regulation module 260 ensures that the stored energy circuit 304 maintains sufficient power to activate the trip solenoid 228 in normal operation of the motor circuit protector 100.

The trip circuit 218 may be activated in a number of different ways. As explained above, the over-voltage trip circuit 220 may activate the trip circuit 218 independently of a signal from the trip output 250 of the microcontroller 226. The microcontroller 226 may also activate the trip circuit 218 via a signal from the trip output 250, which may be initiated by the instantaneous trip module 262, the self protection trip module 264, or the over temperature trip module 266. For example, the instantaneous trip module 262 of the control algorithm 230 sends a signal from the trip output 250 to cause the trip circuit 218 to activate the trip solenoid 228 when one of several regions of a trip curve are exceeded. For example, a first trip region A is set just above a current level corresponding to a motor locked rotor. A second trip region B is set just above a current level corresponding to an in-rush current of a motor. The temperature sensor circuit 222 outputs a signal indicative of the temperature, which is affected by load current and ambient temperature, to the over temperature trip module 266. The over temperature trip module 266 will trigger the trip circuit 218 if the sensed temperature exceeds a specific threshold. For example, load current generates heat internally by flowing through the current path components, including the burden resistor, and external heat is conducted from the breaker lug connections. A high fault current may cause the over temperature trip module 266 to output a trip signal 250 (FIG. 2) because the heat conducted by the fault current will cause the temperature sensor circuit 222 to output a high temperature. The over temperature trip module 266 protects the printed wire assembly from excessive temperature buildup that can damage the printed wire assembly and its components. Alternately, a loose lug connection may also cause the over temperature trip module 266 to output a trip signal 250 if sufficient ambient heat is sensed by the temperature sensor circuit 222.

The trip signal 250 is sent to the trip circuit 218 to actuate the solenoid 228 by the microcontroller 226. The trip circuit 218 may actuate the solenoid 228 via a signal from the over-voltage trip circuit 220. The requirements for "Voltage Regulation," ensure a minimum power supply voltage for "Stored Energy Tripping." The trip circuit 218 is operated by the microcontroller 226 either by a "Direct Drive" implementation during high instantaneous short circuits or by the control algorithm 230 first ensuring that a sufficient power supply voltage is present for the "Stored Energy Trip." In the case where the "Stored Energy" power supply voltage has been developed, sending a trip signal 250 to the trip circuit 218 will ensure trip activation. During startup, the power supply 216 may not reach full trip voltage, so a "Direct Drive" trip operation is required to activate the trip solenoid 228. The control for Direct Drive tripping requires a software comparator output sense mode of operation. When the comparator trip threshold has been detected, the power supply charging current is applied to directly trip the trip solenoid 228, rather than waiting for full power supply voltage.

The over-voltage trip circuit 220 can act as a backup trip when the system 200 is in "Charge Mode." The control algorithm 230 must ensure "Voltage Regulation," so that the over-voltage trip circuit 220 is not inadvertently activated. The default configuration state of the microcontroller 226 is to charge the power supply 216. In microcontroller control fault scenarios where the power supply voltage exceeds the over voltage trip threshold, the trip circuit 218 will be activated. Backup Trip Levels and trip times are set by the hardware design.

The user adjustments circuit 224 accepts inputs from the user adjustment dials 114 and 116 to adjust the motor circuit protector 100 for different rated motors and instantaneous trip levels. The dial settings are converted by a potentiometer to distinct voltages, which are read by the trip curves module 268 along with temperature data from the temperature sensor circuit 222. The trip curves module 268 adjusts the trip curves that determine the thresholds to trigger the trip circuit 218. A burden circuit 306 in the power supply circuit 216 allows measurement of the secondary current signal, which is read by the instantaneous trip module 262 from the peak secondary current analog-to-digital input 238 (shown in FIG. 2) along with the trip curve data from the trip curves module 268. The self-protection trip module 264 also receives a scaled current (scaled by a scale factor of the internal comparator in the current measurement circuitry 241) from the burden resistor in the burden circuit 306 to determine whether the trip circuit 218 should be tripped for self protection of the motor circuit protector 100. In this example, fault conditions falling within this region of the trip curve are referred to herein as falling within region C of the trip curve.

As shown in FIGS. 2 and 3, a trip module 265 is coupled between the trip circuit 218 and the voltage regulation module 260. Trip signals from the instantaneous trip module 262, the self protection trip module 264, and the over temperature trip module 266 are received by the trip module 265.

Figure 4:
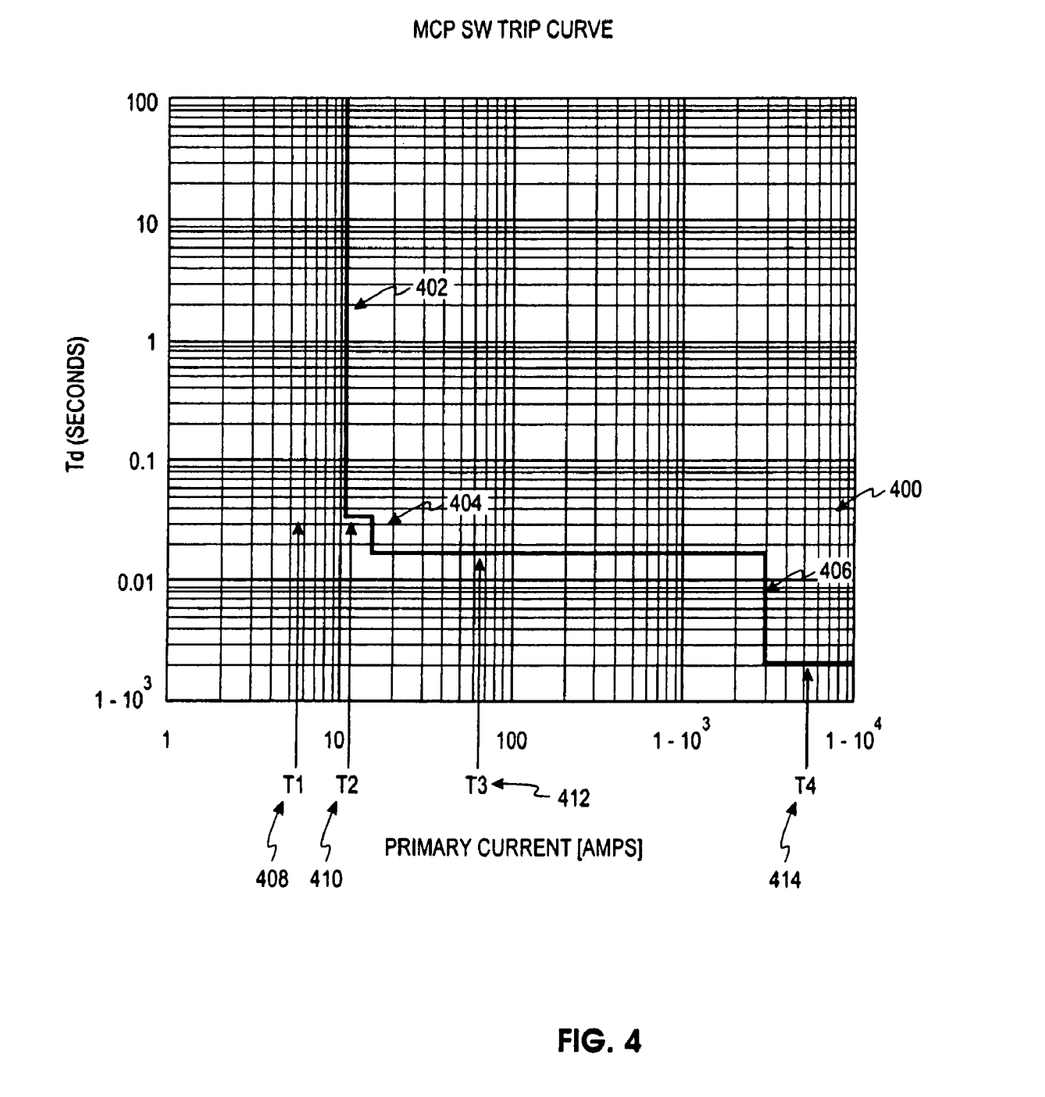
FIG. 4 is an exemplary trip curve having three protection regions, according to an implementation of the present invention.

One example of software trip characteristics is illustrated in FIG. 4, which shows a non-limiting software trip curve 400. The trip curve 400 implements the motor circuit protector's full load ampere (FLA) settings input by a user via the FLA dial 114. The trip curve 400 further implements the instantaneous trip points from the instantaneous trip point (Im) dial 116 for making motor configuration adjustments at the specified full load ampere setting. The trip curve 400 illustrates current level thresholds, or pickup thresholds, for triggering the trip circuit 218. It may be desirable that the motor circuit protector 100 be designed to enable easy motor protection setup for users familiar with the NEC or other applicable code or standard.

The trip curve 400 of FIG. 4 assumes that the applied fault starts at time zero on the vertical axis, which measured in seconds. The magnitude of the applied fault is shown on the horizontal axis and is by convention expressed in Amps.

The trip curve 400 of FIG. 4 depicts three independent time/current protection regions, namely a trip region A 402, a trip region B 404, and a trip region C 406. Region A 402 is also referred to as a locked-rotor avoidance region. Region B is also referred to as an in-rush avoidance region. Region C is also referred to as a self protection region.

Software detection algorithms including the instantaneous trip subroutine 268 and the self protection trip subroutine 264 are run in parallel after steady state is reached, focusing on each of the corresponding trip regions. Each trip region 402, 404, 406, is defined by pickup threshold current values A, B, and C, which are stored in the EEPROM 270. Together, the current values A, B, and C form a trip curve, such as the exemplary one shown in FIG. 4. By "region," it is meant that current values corresponding to the primary current below the threshold current value A, B, or C, optionally within a predetermined tolerance (e.g., +/−5%), will not cause a trip, whereas current values corresponding to the primary current above the threshold current value A, B, or C, optionally within a predetermined tolerance, will cause a trip either immediately (such as when region C is exceeded) or after an intentional delay (such as when region A is exceeded) or after an unintentional delay (such as when region B is exceeded). Stated differently, a region may be characterized as a zone of protection, which when exceeded, will cause a trip. The zone of protection may optionally include a predetermined tolerance at the threshold value (A, B, or C). By "primary current," it is meant any characteristic of the primary current, such as the peak primary current, its rms or nominal values, or any current proportional to the primary current including the secondary current (or its peak, rms, or nominal values), to name a few by way of example only.

The trip region A 402 is considered a locked rotor avoidance region and is generally designed to avoid nuisance tripping at motor locked rotor current levels on specified instantaneous trip point settings. A locked rotor condition generally occurs when the rotating member of the motor 204 is locked in a stationary position, causing excess current to be drawn to the locked rotor. The trip region A 402 implements a delayed trip.

The trip region B 404 is considered an in-rush avoidance region, and the trip region C 406 is considered a high current breaker self-protection region. The trip regions B and C 404, 406 are designed to avoid motor in-rush, which occurs when, on startup of the power source, surges of current or voltage cause erroneous tripping, thereby creating a nuisance. The trip regions B and C 404, 406 cause the motor circuit protector to trip as soon as the input signals are qualified and, thus, exhibit a "no intentional delay" characteristic.

During startup of the motor circuit protector 100, the trip region C 406 focuses on the instantaneous self protection trip feature. In an implementation neither the trip region A 402 nor the trip region B 404 is active until the steady-state trip region is achieved. After steady state has been reached and the switch settings have been determined, pickup thresholds for the trip region C 406 may be moved closer to the trip region B 404. The trip feature of the trip region C 406 extends upward in time and may be considered a backup to the trip characteristics of both the trip regions A and B 402, 404. Note that the trip regions A and B 402, 404 can be simultaneously active, or one or both regions 402, 404 can be disabled. It should also be understood that regions 402 and 404 can be identical.

The trip region A 402 and the trip region B 404 use the peak current input 238 from the burden resistor and are based on temperature compensated analog to digital (A/D) values. The trip region C 406 uses the startup peak current comparator input 240, which is connected to a comparator input contained in the power supply 216. The startup peak current comparator input 240 has a relatively fast comparator circuit such that high instantaneous short circuits and/or fault currents may be detected immediately. Thus, the trip region C 406 has a faster qualification trip time than the trip region B 404 but is less accurate than the trip regions A and B 402, 404.

The instantaneous trip point settings of the motor circuit protector 100 have pickup thresholds of the trip regions A and B 402, 404 set to the same levels without disabling the function of the trip region A 402. For pickup thresholds of equal value, the trip region A 402 may be considered a backup to the trip region B 404.

The motor circuit protector 100 is designed to have flexible control over the characteristics of the trip curve 400. All trip curve settings and behavior are specified in the calibration EEPROM 270, where possible.

The trip curve 400 of FIG. 4 shows four test points, T1 408, T2 410, T3 412, and T4 illustrating current levels that will activate the various trip regions 402, 404, 406. For example, because the test point T1 408 is below the pickup threshold of the trip region A 402, test point T1 408 will not trip the motor circuit protector 100. Test point T2 410 is above the pickup threshold of the trip region A 402 and will, thus, pickup with a time delay associated with the trip region A 402. Test point T3 412 is above the pickup threshold of the trip region B 404 and will pickup at time $T_d$ (T3). Test point T4 414 is above the pickup threshold of the trip region C 406 and will pickup at time $T_d$ (T4).

The trip regions A, B, and C 402, 404, 406 have variable activation times that are largely dependent on the fault powered supply and trip priorities. For example the trip region C 406 may be broken down into a first half-cycle detection "$C_1HC$" during the first 4mS after the processor starts, a second half-cycle detection "$C_2HC$" after the power supply comes up but before the switch settings and temperature settings are known, and finally the steady-state trip region "$C_nHC$."

Table 1 below provides the relationship between the trip curve 400 and the power-up sequence according to one embodiment.

Redundant protection regions remain active throughout the startup and steady-state operation, rather than turning off higher protection levels during steady-state. This redundancy provides improved time/current trip performance for a wide variety of short circuit conditions and improves system safety properties.

Figure 5:
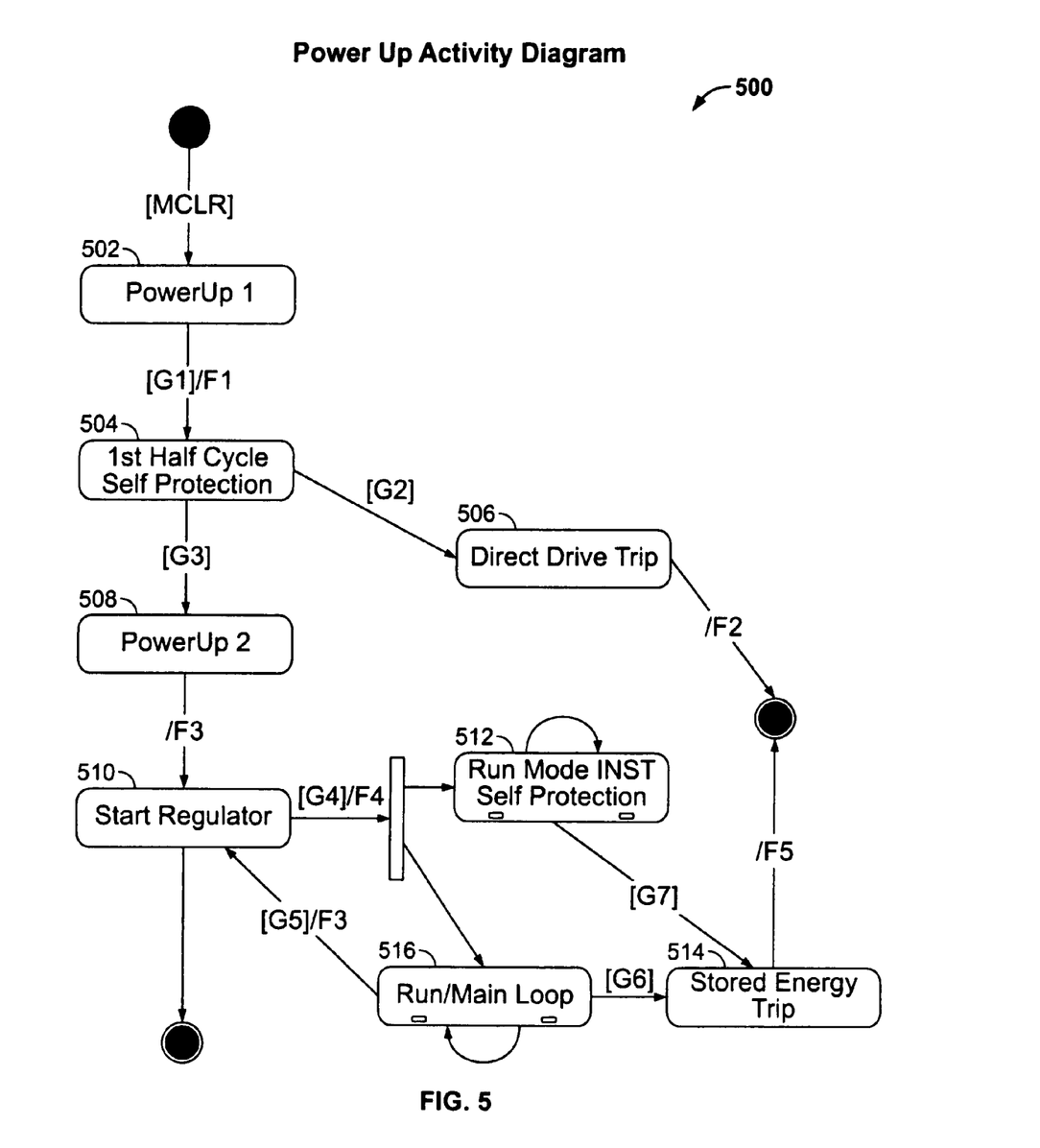
FIG. 5 is a diagram expressed in a Unified Modeling Language (UML) illustrating a power-up activity diagram according to an implementation of the present invention.

FIG. 5 is a diagram expressed in a Unified Modeling Language (UML) illustrating a power-up (i.e., startup mode) activity diagram 500 according to an implementation of the present invention. The activity diagram 500 conventionally includes Guards, designated by the letter G, and Actions, designated by the letter F. A legend of the Guards and Actions is provided below:

|  | Description |
|---|---|
| Guard | |
| G1 | Bypass RAM initialization after reset |
| G2 | High instantaneous (INST) self-protection fault sensed (region C) |
| G3 | Self-protection monitor time expired |
| G4 | Stored energy trip voltage |
| G5 | Low regulation voltage |
| G6 | Trip detection |
| G7 | Self-protection trip detection (region C) |
| Action | |
| F1 | Initialize first half-cycle self-protection (region C) |
| F2 | Direct Drive trip |
| F3 | Initialize for voltage regulation start |
| F4 | Initialize for run (steady-state) mode |
| F5 | Stored Energy trip |

TABLE 1

| Power Up Sequence Description | Active Region(s) 402, 404, 406 | Active From | Duration of Activation | Notes: |
|---|---|---|---|---|
| 1st Half Cycle Detection | Region C 406/$C_1HC$ | 140 μs to 250 μs | 4 ms | Look for self protection pickup thresholds at startup |
| Voltage Regulator Start | None | about 4 ms | about 4 ms to 80 ms/56.8 ms | Voltage Regulator start time is variable |
| 2$^{nd}$ Half Cycle Detection | Region C 406/$C_2HC$ | Just prior to 2$^{nd}$ half cycle peak or as much as 80 ms/56.8 ms | Code Initialization | Look for self protection pickup thresholds after reaching stored energy trip voltage and before switch information is known |
| Region A 402, B 404, C 406 in Steady-state | Region A 402, B 404, C 406/$C_nHC$ | about 8 mS up to 80 ms/56.8 ms | While Regulating | Control algorithm 230 is regulating power supply |

The trip curve 400 of FIG. 4 shows nominal pickup and trip time delays per trip region 402, 404, 406. It is generally desirable to attempt a tripping action close to the nominal pickups and trip times of each trip region 402, 404, 406. It is contemplated that the tolerance specifications for specific settings may cause overlap in the trip regions A, B, and/or C 402, 404, 406, which must be considered when determining test points T2 410, T3 412, and T4 414.

The design of the present invention improves instantaneous trip protection of a breaker or motor circuit protector system. The design improves short circuit fault detection for both "close on fault" and "fault in steady-state" operation.

The state diagram 500 initializes to a PowerUp 1 state 502, which detects a power-up or startup of the motor circuit protector 100 (e.g., primary current is applied when the handle 120 is moved to the ON position 124). The control algorithm 230 is initialized for first half-cycle self-protection (region C 406 of the trip curve 400 shown in FIG. 4), and half-cycle self-protection 504 is carried out by the control algorithm 230. If a high INST self-protection fault is sensed (G2), the state diagram 500 moves to a Direct Drive Trip state 506, which activates a Direct Drive trip (F2). Upon expiration of a self-protection monitor time (G3), the state diagram 500 transitions to a PowerUp 2 state 508. The control algorithm 230 initializes for voltage regulation start (in the power supply circuit 216) (F3), and the state diagram 500 transitions to a start regulator state 510. If the voltage regulator in the power supply circuit 216 reaches a Stored Energy trip voltage level, the control algorithm 230 is initialized for a run (or steady-state) mode (F4). A run mode INST self-protection state 512 is maintained until a self-protection trip is detected (G7), and the state diagram 500 enters a Stored Energy trip state 514. Simultaneously with the run mode INST self-protection state 512 is a run-mode main loop state 516 that attempts to maintain the voltage regulator at the Stored Energy trip voltage level. When the voltage regulator voltage falls below a pre-determined threshold, the control algorithm 230 initializes for regulation start (F3) and enters the start regulator state 510 and maintains this loop until the voltage regulator has reached a Stored Energy trip voltage level. In this way, if a trip is detected (G6), the Stored Energy trip state 514 has a sufficient voltage to apply to the trip solenoid 228 to trip the motor circuit protector 100.

Figure 6A:
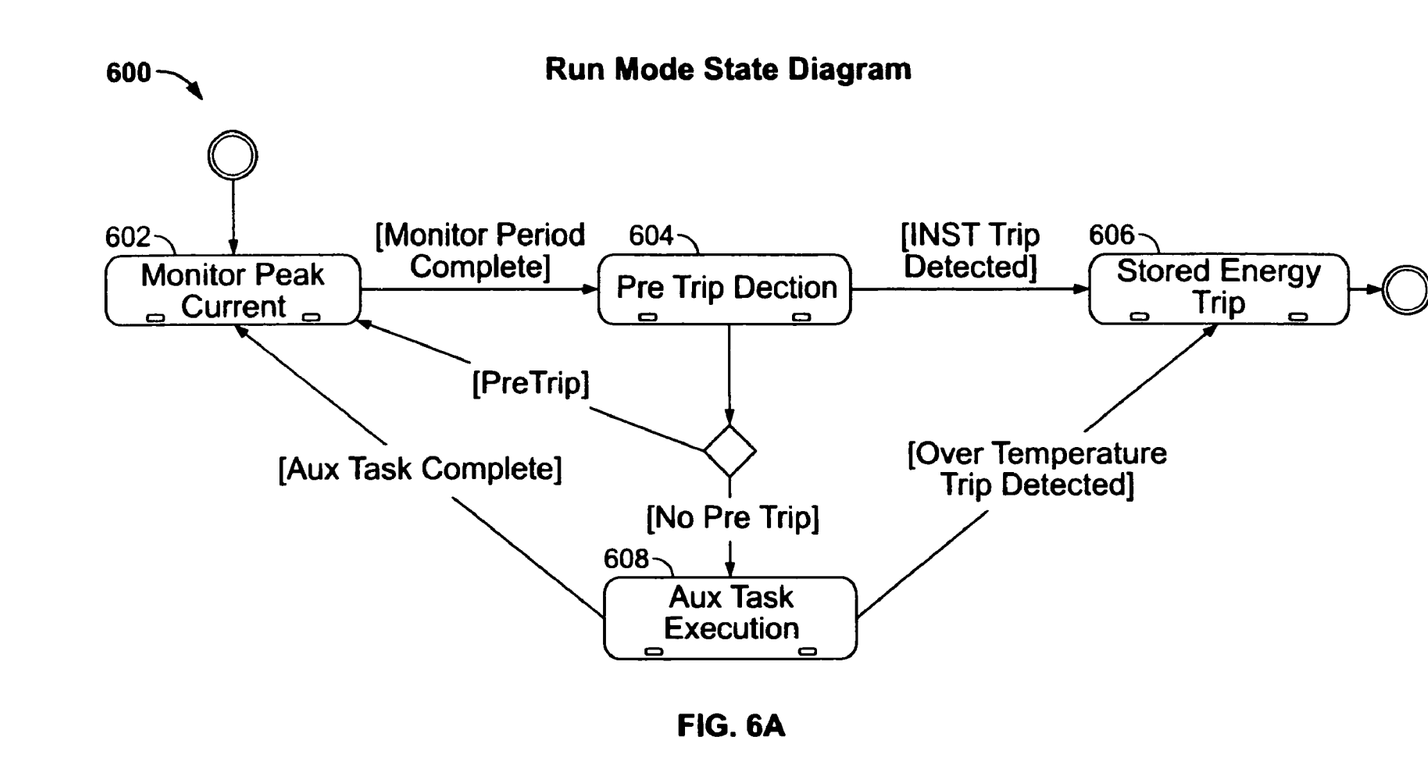
FIG. 6a is a UML diagram illustrating a run-mode state diagram according to an implementation of the present invention.

FIG. 6a is a UML diagram illustrating a run-mode state diagram 600 according to an implementation of the present invention. The state diagram 600 begins with a monitor peak current state 602. When the monitor period is complete, the state diagram 600 transitions to a pre-trip detection state 604. If an instantaneous trip is detected, the state diagram 600 moves to a Stored Energy trip state 606, which may correspond to the Stored Energy trip state 514 shown in FIG. 5.

Figure 7:
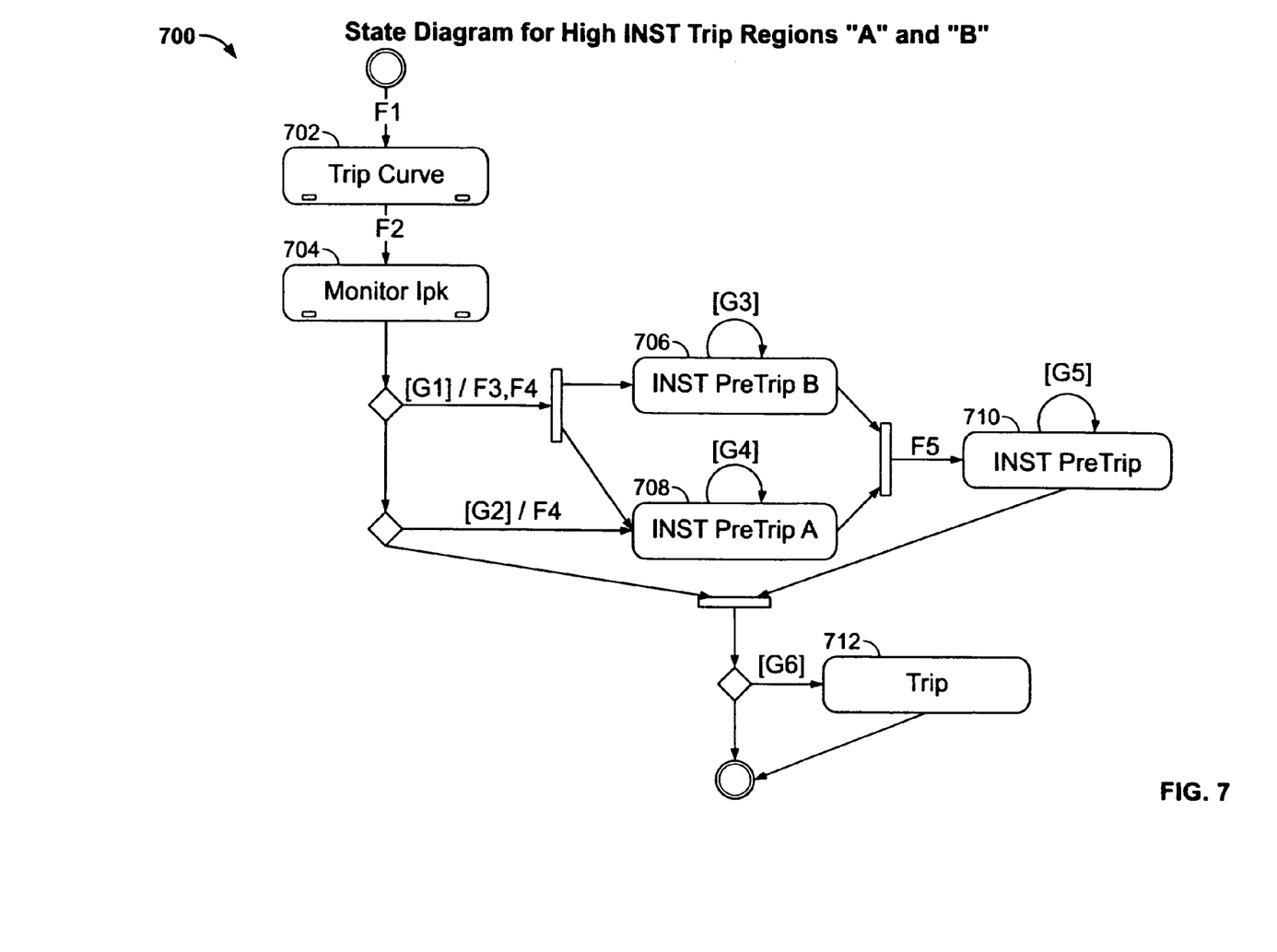
FIG. 7 is a UML diagram illustrating a state diagram for instantaneous trip regions A (locked-rotor avoidance region) and B (in-rush avoidance region)

If the monitor period has expired and no pre-trip is detected, the state diagram 600 enters an auxiliary task state 608 (shown in FIG. 7). If a pre-trip is detected, the state diagram 600 returns to the monitor peak current state 602. When the auxiliary tasks have been completed, the state diagram 600 returns to the monitor peak current state 602. If an over-temperature trip is detected, the state diagram 600 moves to the Stored Energy trip state 606.

Figure 6B:
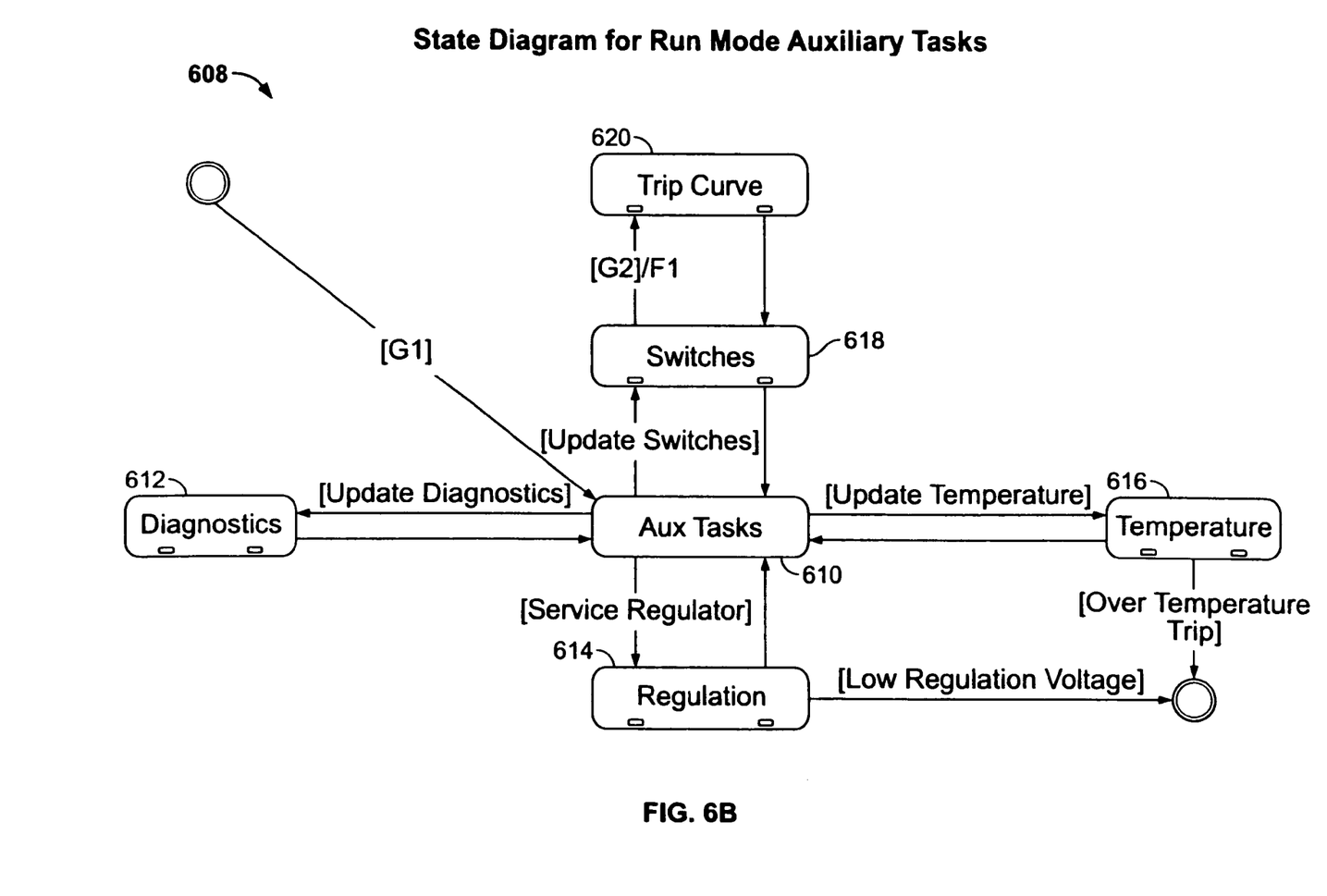
FIG. 6b is a UML diagram illustrating a state diagram for run-mode auxiliary tasks.

FIG. 6b is a UML diagram illustrating a state diagram 608 for run-mode (steady-state mode) auxiliary tasks according to an implementation of the present invention. The Guards and Actions applicable to this state diagram 608 are as follows.

| | Description |
|---|---|
| Guard | |
| G1 | a timer for monitoring the peak current has expired and no pre-trip is detected |
| G2 | a switch change is detected on the dials 114, 116 |
| Action | |
| F1 | Initialize trip curve settings on switch change |

If the monitor timer is expired and no pre-trip is detected (G1), the state diagram 608 enters the auxiliary tasks state 610. Various auxiliary tasks may be carried out, including diagnostics 612, temperature sensing 616, voltage regulation 614, and switch position detection 618. In the switch position detection state 618, if a switch change is detected (G2), the position(s) of the dials 114, 116 are converted to digital values representing the dial position(s), and the corresponding trip curve settings (e.g., trip threshold current values for trip regions A, B, and C) are fetched from the EEPROM 270. The auxiliary tasks are terminated upon detection of an over-temperature trip or a low-voltage across the voltage regulator.

FIG. 7 is a UML diagram illustrating a state diagram 700 for the INST trip regions A (locked-rotor avoidance region) and B (in-rush avoidance region). The state diagram 700 includes the following Guards and Actions specified below.

| | Description |
|---|---|
| Guard | |
| G1 | Peak current greater than B threshold |
| G2 | Peak current greater than A threshold |
| G3 | Pre-trip B timer active |
| G4 | Pre-trip A timer active |
| G5 | Pre-trip Timer active |
| G6 | Trip Logic (see Trip Logic table below |
| Action | |
| F1 | Get/update trip curve from EEPROM 270 |
| F2 | Get/reset peak current |
| F3 | Pre-trip B event signal |
| F4 | Pre-trip A event signal |
| F5 | Pre-trip event signal |

Trip Logic

Trip B: At least 2 INST Pre-trip B events AND Pre-trip B delay; and

Trip A: At least 5 INST Pre-trip A events AND Pre-trip A delay.

In the trip curve module 702, the control algorithm 230 fetches the trip curve from EEPROM 270 (F1). The trip curve may be selected based upon the positions of the dials 114, 116 detected by the control algorithm 230. The trip curve for the selected dial 114, 116 combination is read from the EEPROM 270. The peak current is sensed and monitored in monitor module 704. If the peak current is greater than the in-rush avoidance current threshold B (e.g., trip region 404), a pre-trip B event signal (F3) and a pre-trip A event signal (F4) are activated. The controller 230 enters simultaneously an INST pre-trip B state 706 and an INST pre-trip A state 708 and polls until a pre-trip event signal is received. If the peak current is greater than the locked-rotor avoidance current threshold A (e.g., trip region 402) and less than the in-rush avoidance current threshold B (e.g., trip region 404), a pre-trip A event signal (F4) is activated and the INST pre-trip A state 708 is entered. In the INST pre-trip B state 706, a pre-trip B timer is active (G3), and in the INST pre-trip A state 708, a pre-trip A timer is active (G4). When a pre-trip event signal is received (F5), an INST pre-trip state 710 is entered for the duration of a pre-trip timer (G5). Trip logic (G6) is parsed before transitioning to a trip state 712. The trip logic depends upon whether a Trip B or Trip A event has been detected. In the case of a Trip B event, the Trip Logic requires at least two INST pre-trip B events to occur and a pre-trip B delay to expire. In the case of a Trip A event, the Trip Logic requires at least five INST pre-trip A events to occur and a pre-trip A delay to expire. Once these conditions are satisfied, the trip state 712 is entered and the state diagram 700 ends.

Figure 8:
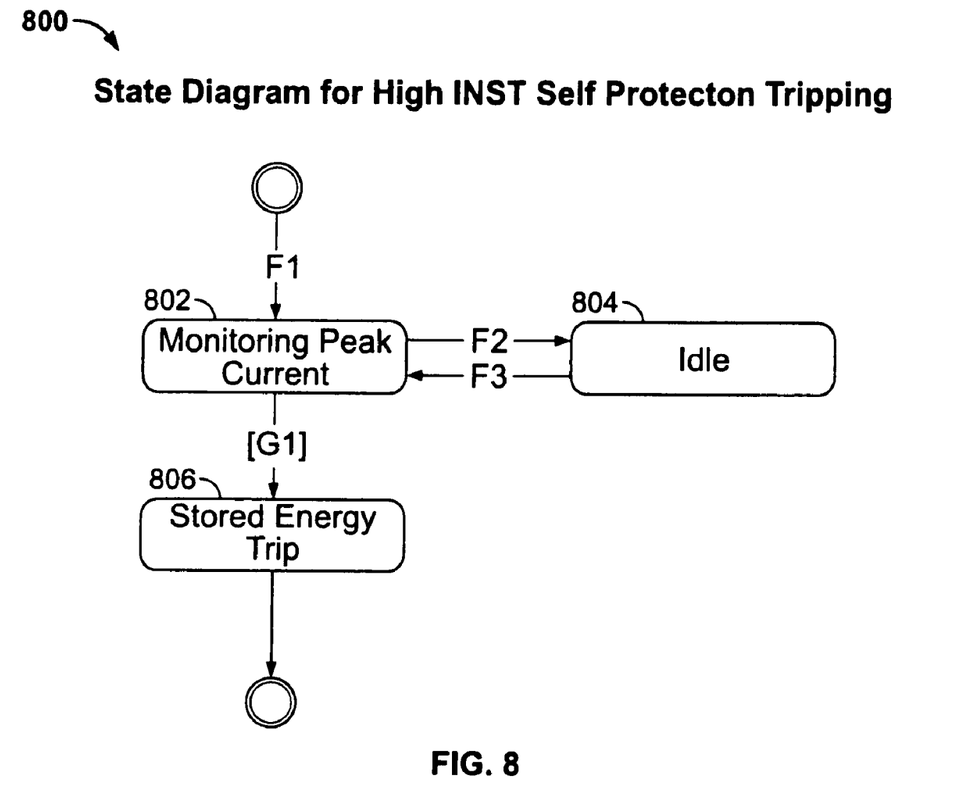
FIG. 8 is a UML diagram illustrating a state diagram for high instantaneous self-protection tripping for region C (self-protection region).

FIG. 8 is a UML diagram illustrating a state diagram 800 for high instantaneous self-protection tripping for region C (self-protection region). The Guards and Actions applicable to this state diagram 800 are provided below.

|  | Description |
| --- | --- |
| Guard | |
| G1 | Comparator trip confirmation |
| Action | |
| F1 | Comparator Object initialized |
| F2 | Comparator Interrupt stopped |
| F3 | Comparator Interrupt Started |

A comparator software object is initialized (F1), and a monitoring peak current state 802 is entered. An idle state 804 is entered when a comparator interrupt is stopped (F2) and is exited when a comparator interrupt is started (F3). If a comparator trip is confirmed (G1), the state diagram 800 transitions to a Stored Energy trip state 806, which may correspond to the Stored Energy trip state 514 shown in FIG. 5. The comparator interrupt is started when a self-protection voltage signal corresponding to the secondary current from the current transformers 210, 212, 214 exceeds a calibration reference voltage value.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A method of activating a trip circuit of a circuit protector having a startup mode of operation followed by a steady-state mode of operation, comprising:

reading a first current value defining a first trip region, the first trip region having a first pickup threshold that includes the first current value, the first trip region being exceeded when a primary current sensed by the circuit protector exceeds the first pickup threshold;

reading a second current value defining a second trip region, the first current value being greater than the second current value, the second trip region having a second pickup threshold that includes the second current value, the second trip region being exceeded when the primary current exceeds the second pickup threshold;

in the startup mode of operation, automatically detecting whether the primary current exceeds the first trip region; and in the steady-state mode of operation, simultaneously automatically detecting whether the primary current exceeds the first trip region or the second trip region.

2. The method of claim 1, wherein the circuit protector is a motor circuit protector that is coupled to a motor associated with a locked rotor current threshold and an in-rush current threshold.

3. The method of claim 2, further comprising reading a third current value defining a third trip region, the first current value being greater than the third current value, the third trip region having a third pickup threshold that includes the third current value, the third trip region being exceeded when the primary current exceeds the third pickup threshold, wherein the simultaneously detecting includes simultaneously automatically detecting whether the primary current exceeds the first trip region, the second trip region, or the third trip region.

4. The method of claim 3, wherein the first trip region corresponds to a self-protection region of the protector circuit, the second trip region corresponds to one of an in-rush avoidance region and a locked-rotor avoidance region, and the third trip region corresponds to the other one of the in-rush avoidance region and the locked-rotor avoidance region, the pickup threshold of the in-rush avoidance region being based upon the in-rush current threshold of the motor, and the pickup threshold of the locked-rotor avoidance region being based upon the locked-rotor threshold of the motor.

5. The method of claim 4, further comprising immediately tripping the circuit protector when the in-rush avoidance region or the self-protection region is exceeded without any intentional time delay.

6. The method of claim 3, wherein the second pickup threshold is equal to the third pickup threshold.

7. The method of claim 1, wherein the simultaneously automatically detecting is initiated only after the automatically detecting.

8. The method of claim 3, further comprising adjusting, in the steady-state mode of operation, the first pickup threshold to be closer to one of the second pickup threshold and the third pickup threshold.

9. A circuit protector for protecting a circuit from excessive current, comprising:

a handle having at least on, off, and tripped positions;

control circuitry including a controller programmed to initiate the circuit protector to a startup mode of operation in response to the handle being positioned in the on position, the control circuitry further including a memory that stores data representing a plurality of trip curves, each trip curve including at least a first current value and a second current value that is less than the first current value, the first current value defining a first trip region and the second current value defining a second trip region; and a tripping mechanism operatively coupled to the control circuitry, wherein the controller is further programmed to:

in at least the startup mode of operation, automatically detect whether a primary current sensed by the circuit protector exceeds the first trip region and, in response thereto, cause the tripping mechanism to trip the circuit breaker, and, in a steady-state mode of operation that follows the startup mode of operation, automatically detect whether the primary current exceeds the first trip region, and, in response thereto, cause the tripping mechanism to trip the circuit protector, and automatically detect whether the primary current exceeds the second trip region, and, in response thereto, cause the tripping mechanism to trip the circuit protector.

10. The system of claim 9, wherein the circuit protector is a motor circuit protector that is coupled to a motor associated with a locked rotor current threshold and an in-rush current threshold.

11. The system of claim 10, wherein at least one of the trip curves includes a third current value that is less than the first current value, the third current value defining a third trip region, the controller is further programmed to, in the steady-state mode of operation, automatically detect whether the primary current exceeds the third trip region, and, in response thereto, cause the tripping mechanism to trip the motor circuit protector.

12. The system of claim 9, wherein the startup mode of operation has a duration substantially equal to the first full cycle of the primary current.

13. The system of claim 11, wherein the first trip region corresponds to a self-protection region of the motor protector circuit, the second trip region corresponds to one of an in-rush avoidance region and a locked-rotor avoidance region, and the third trip region corresponds to the other one of the in-rush avoidance region and the locked-rotor avoidance region, the pickup threshold of the in-rush avoidance region being based upon the in-rush current threshold of the motor, and the pickup threshold of the locked-rotor avoidance region being based upon the locked-rotor threshold of the motor.

14. The system of claim 11, wherein the controller is further programmed to, in the steady-state mode of operation, adjust the first current value to be closer to one of the second current value and the third current value.

15. The system of claim 13, wherein the tripping mechanism trips the circuit protector, following an intentional time delay, when the primary current exceeds the locked-rotor avoidance region.

16. The system of claim 13, wherein the tripping mechanism immediately trips the circuit protector when the primary current exceeds the in-rush avoidance region or the self-protection region.

17. A method comprising:
sensing a primary current in a motor circuit protector adapted to be coupled to a motor having an associated locked-rotor current and an in-rush current, the motor circuit protector having a startup mode of operation followed by a steady-state mode of operation;
deriving a power supply voltage from the primary current, the duration of the startup mode of operation being defined by at least the length of time for a power supply voltage to reach a predetermined voltage level after primary current is first applied to the motor circuit protector;
storing in a memory data representing a plurality of trip curves, each trip curve having at least three current values respectively representing a locked-rotor avoidance region, an in-rush avoidance region, and a self-protection region, wherein the current value representing the self-protection region is greater than the corresponding current values representing the locked-rotor avoidance region and the in-rush avoidance region;
automatically detecting, in at least the startup mode of operation, whether the primary current exceeds the self-protection region, and, if so, tripping the motor circuit protector; and
automatically detecting, in the steady-state mode of operation, whether the primary current exceeds the locked-rotor avoidance region or the in-rush avoidance region, and, if so, tripping the motor circuit protector.

18. The method of claim 17, further comprising, in the steady-state mode of operation, adjusting the current value associated with the self-protection region to be closer to the current values corresponding to the locked-rotor avoidance region and the in-rush avoidance region.

19. The method of claim 17, further comprising automatically detecting, in the steady-state mode of operation, whether the primary current exceeds the self-protection region, and, if so, tripping the motor circuit protector.

20. The method of claim 17, wherein the automatically denominating are carried out substantially simultaneously.

21. The method of claim 17, wherein the current values corresponding to the locked-rotor avoidance region and the in-rush avoidance region are identical.

22. The method of claim 17, further comprising receiving a signal indicative of a trip curve setting and automatically selecting from the memory one of the plurality of trip curves based on the trip curve setting.

* * * * *